United States Patent [19]

Oroskar et al.

[11] Patent Number: 4,632,149

[45] Date of Patent: Dec. 30, 1986

[54] ROTARY VALVE FOR INTERCONNECTING CONDUITS

[75] Inventors: Anil R. Oroskar, Brookfield; George Mack, Justice, both of Ill.

[73] Assignee: UOP Inc., Des Plaines, Ill.

[21] Appl. No.: 679,858

[22] Filed: Dec. 10, 1984

[51] Int. Cl.[4] .......................................... F16K 11/074
[52] U.S. Cl. .......................... 137/625.15; 137/625.11; 137/625.46
[58] Field of Search .............. 137/625, 625.11, 625.12, 137/625.13, 625.15, 625.46

[56] References Cited

U.S. PATENT DOCUMENTS

| | | | |
|---|---|---|---|
| 2,985,589 | 5/1961 | Broughton et al. | 210/34 |
| 3,040,777 | 6/1962 | Carson et al. | 137/625.15 |
| 3,114,393 | 12/1963 | Vlasic | 137/625.46 |
| 3,192,954 | 7/1965 | Gerhold et al. | 137/625.11 |
| 3,223,123 | 12/1965 | Young | 137/625.46 |
| 3,422,848 | 1/1969 | Liebman et al. | 137/625.15 |
| 3,451,428 | 6/1969 | Pruett | 137/625.46 |
| 3,460,574 | 8/1969 | Risher | 137/625.46 |
| 3,477,207 | 11/1969 | Auger | 137/625.46 X |
| 3,633,621 | 1/1972 | Myers | 137/625.15 X |
| 3,747,630 | 7/1973 | Hurrell | 137/625.46 X |
| 4,280,531 | 7/1981 | Milberger et al. | 137/624.11 |
| 4,396,036 | 8/1983 | Horikawa et al. | 137/625.46 X |
| 4,402,832 | 9/1983 | Gerhold | 210/659 |
| 4,501,297 | 2/1985 | Baker | 137/625.46 X |

Primary Examiner—Alan Cohan
Assistant Examiner—John A. Rivell
Attorney, Agent, or Firm—Thomas K. McBride; John F. Spears, Jr.; Richard J. Cordovano

[57] ABSTRACT

A unitary multiport rotary disc valve capable of accomplishing the simultaneous interconnection of a plurality of conduits in accordance with a previously determined cycle, where any conduit communicates with no more than one other conduit at any one cycle step, or valve index position. The conduits to be interconnected are attached to the bottom of a discoid stationery body, or stator, having channels in it which communicate between the conduits and flow paths in a discoid rotating body, or rotor, which assumes various positions according to the cycle steps and distributes fluid flowing in the conduits in a different manner in each cycle step.

10 Claims, 12 Drawing Figures

Step 1

ROTARY VALVE FOR INTERCONNECTING CONDUITS

FIELD OF THE INVENTION

This invention relates to the art of multiport rotary disc valves. More particularly, it relates to such valves which are capable of accomplishing the simultaneous interconnection of a plurality of conduits in accordance with a predetermined periodic sequence. Further, it deals with such valves which are useful where such plurality of conduits may be divided into two or three separate groups according to their function and it is desired to interconnect the conduits in accordance with a relationship among the groups.

INFORMATION DISCLOSURE

Multiport rotary disc valves are the subjects of U.S. Pat. Nos. 3,040,777 (Carson et al.) and 3,422,848 (Liebman et al.); these are believed to be the most relevant references. The teachings of these patents are hereby incorporated in full into this document. A preferred embodiment of the invention of these patents is where the grooves or tracks are contained within the stator and piping is used to communicate between rotor openings. This embodiment has been used in practicing the process of U.S. Pat. No. 2,985,589 (Broughton et al.), which is described herein and other similar processes. However, in the practice of a process such as disclosed in U.S. Pat. No. 4,402,832 (Gerhold), which is described below, the valve of these references cannot be utilized. A valve having utility similar to the multiport rotary disc valve of Carson and Liebman et al. is disclosed in U.S. Pat. No. 3,192,954 (Gerhold et al.).

BRIEF SUMMARY OF THE INVENTION

This invention relates to a unitary multiport rotary disc valve useful in transferring a plurality of different fluid streams among different locations in accordance with a previously determined cycle. The fluid streams are contained in conduits which are interconnected by means of the valve. Any conduit communcates with no more than one other conduit at any one cycle step, or valve index position. The conduits to be interconnected are attached to the bottom of a stationary body, or stator, having channels in it which communicate between the conduits and flow paths in a rotating body, or rotor, which assumes various positions according to the cycle steps and distributes fluid flowing in the conduits in a different manner in each cycle step.

There are many instances in which it is necessary to route a fluid stream to one location for a period of time, then to another location for a period of time, and so forth for multiple locations. This relatively simple problem of routing a single fluid stream to various destinations in a previously determined cycle or periodic sequence is easily accomplished with one or more devices such as a multiport rotary plug valve. When it is necessary to simultaneously route more than a single fluid stream to various destinations, it is highly desirable to use a single device rather than numerous individual valves, as discussed inthe above-mentioned Carson patent (U.S. Pat. No. 3,040,777). A multiport rotary disc valve is such a device.

It is among the objects of this invention to provide unitary mechanical valve apparatus for simultaneously accomplishing the interconnection of a plurality of conduits in accordance with a previously determined cycle, where any conduit communicates with no more than one other conduit at any one valve index position. It is also among the objectives to provide a valve smaller in physical size and having fewer maintenance requirements than prior art valves. A broad embodiment of the invention is a valve comprising: (a) a stator having a seating surface and a plurality of locations for conduit connection not at said stator seating surface; (b) a rotor having a seating surface which is in fluid-tight contact with said stator seating surface; (c) means for rotating the rotor about an axis of rotation to various valve index positions in accordance with said previously determined cycle; (d) a plurality of ports in said stator which are disposed around the axis of rotation, each port extending from said stator seating surface through the stator, the number of ports being at least equal to the number of said conduits and each conduit communicating with a port; (e) a plurality of openings in said rotor, each opening extending from said rotor seating surface through the rotor, the number of openings being at least equal to the number of ports, the openings disposed about the axis of rotation such that in each index position, each port of the stator is in register with a different one of the openings and each opening is not necessarily in register with a port; and (f) a plurality of crossover pipes connected to the rotor, each crossover pipe communicating between two openings in order to complete fluid transfer paths between conduits in accordance with said previously determined cycle, where that part of a fluid transfer path between a conduit and a crossover pipe comprises a port and an opening, the number of crossover pipes is at least equal to the number of ports, and the crossover pipes are arranged in a pattern such that indexing through a whole of one of said previously determined cycles requires the rotor to rotate through 180 degrees.

It is also among the objects of this invention to provide such a valve which is useful where said plurality of conduits may be placed, or divided, into a first and a second group of conduits according to their function and it is desired to interconnect the conduits in accordance with a relationship between the groups and in accordance with a previously determined cycle, conduits of the first group being simultaneously connected to conduits of the second group at each step of said cycle such that in a complete cycle, each conduit of the first group comes into individual communication with every conduit of the second group, where any conduit communicates with no more than one other conduit at any one valve index position. An embodiment for achieving this object is a valve comprising: (a) a discoid stator having a substantially flat seating surface and having a plurality of conduit connection locations not at said stator seating surface; (b) a discoid rotor having a seating surface which is in fluid-tight contact with said stator seating surface; (c) means for rotating the rotor about an axis of rotation to various valve index positions in accordance with said previously determined cycle, said axis being substantially perpendicular to said seating surfaces; (d) a plurality of ports in said stator which extend from said stator seating surface through the stator to communicate with said conduits, the number of ports being equal to the number of said conduits and one port communicating with each conduit to form a first group of ports and a second group of ports corresponding to said first and second groups of conduits, the ports being disposed around said axis of rotation; (e) a plurality of openings in said rotor, each opening extending from said rotor seating surface through the rotor, the number of openings being equal to four times the number of conduits in the group having the most conduits, the openings being divided into a first and a second group with an equal number in each group, where the first group of openings is associated with said first group of ports and the second group of openings is associated with said second group of ports and the openings are disposed about the axis of rotation such that in each index position, each port of said first group in the stator is in register with a different one of the openings of said first group of rotor openings, each port of said second group in the stator is in register with a different one of the openings of said second group of rotor openings and any openings in excess of the number of ports are sealed off at said seating surfaces; and (f) a plurality of crossover pipes connected to the rotor, each crossover pipe communicating between two openings in order to complete fluid transfer paths between conduits of said first and second groups in accordance with said previously determined cycle, where that part of a fluid transfer path between a conduit and a crossover pipe consists of a port and an opening, the number of crossover pipes is equal to twice the number of conduits in the group having the most conduits, only one half or fewer of the crossover pipes are in use at any one time, and the crossover pipes are arranged in a pattern such that indexing through a whole of one of said previously determined cycles requires the rotor to rotate through 180 degrees.

It is a further object of this invention to provide such a valve which is useful where said plurality of conduits may be placed into first, second, and third groups according to their function and it is desired to interconnect the conduits in accordance with a relationship among the groups and in accordance with a previously determined cycle, where any conduit communicates with no more than one other conduit at any one valve index position. An embodiment for achieving this object is a valve comprising: (a) a discoid stator having a substantially flat seating surface and having said plurality of conduit connection locations not at said stator seating surface; (b) a discoid rotor having a seating surface which is in fluid-tight contact with said stator seating surface; (c) means for rotating the rotor about an axis of rotation to various valve index positions in accordance with said previously determined cycle, said axis being substantially perpendicular to said seating surfaces; (d) a plurality of ports in said stator, at least a number of the ports which is equal to the number of said conduits being divided into a first, a second, and a third group of ports and disposed around the axis of rotation, each port extending from said stator seating surface through the stator, the number of ports being at least equal to the number of said conduits and each conduit communicating with a port; (e) a plurality of openings in said rotor, each opening extending from said rotor seating surface through the rotor, the number of openings being at least equal to the total number of ports, the openings being divided into a first and a second set of openings and disposed about the axis of rotation such that in each index position, each port of said first and said second group in the stator is in register with a different one of the openings of the first set of rotor openings, each port of said third group in the stator is in register with a different one of openings of the second set of rotor openings and each opening is not necessarily in register with a port; and (f) a plurality of crossover pipes connected to the rotor, each crossover pipe communicating between two openings in order to complete fluid transfer paths between conduits of said first and second groups, conduits of said first and third groups, and conduits of said second and third groups in accordance with said previously determined cycle, where that part of a fluid transfer path between a conduit and a crossover pipe consists of a port and an opening, the number of crossover pipes is at least equal to the number of ports in said three groups, and the crossover pipes are arranged in a pattern such that indexing through a whole of one of said previously determined cycles requires the rotor to rotate through 180 degrees.

BACKGROUND OF THE INVENTION

Figure 1:
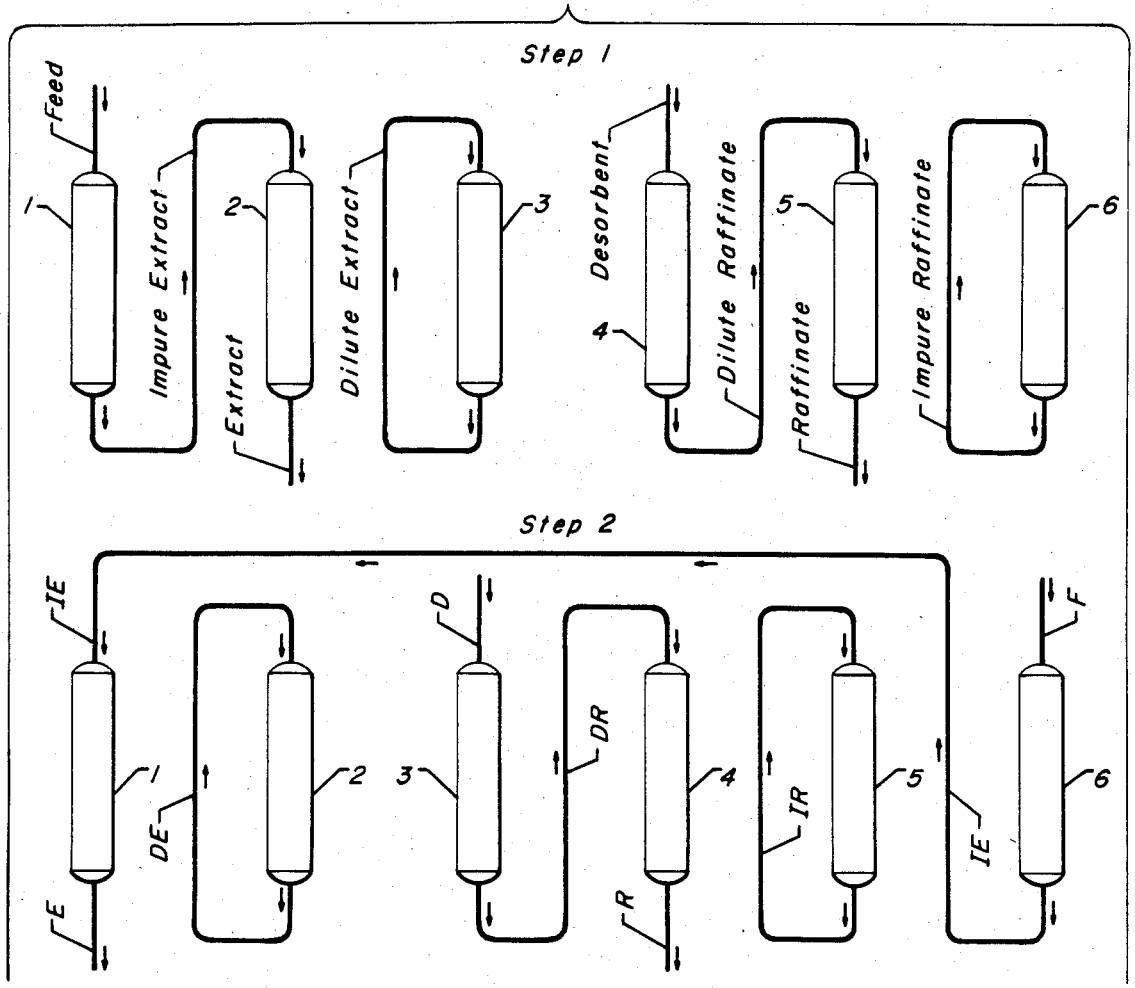
FIG. 1 depicts in schematic form six separation zones, or units, with two different fluid flow arrangements, where each arrangement is that associated with a single step of the process of U.S. Pat. No. 4,402,832 (Gerhold).

The separation of various substances through selective absorption using a simulated moving bed of adsorbent is an example of a process in which a multiport rotary disc valve is useful. Simulation of a moving adsorbent bed is described in U.S. Pat. No. 2,985,589 (Broughton et al.), which is mentioned above. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be imply described as dividing the bed into series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits.

There are many different process requirements in moving bed simulation processes, resulting in different flow schemes and thus variations in rotary valve arrangement. For example, in addition to the four basic streams described in Broughton (U.S. Pat. No. 2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton (U.S. Pat. No. 2,985,589). It may be desirable to pass fluid through a bed or beds in the reverse direction from normal flow. This is commonly known as backflushing, a subject treated in U.S. Pat. No. 4,319,929 (Fickel). Other applications for various arrangements of multiport rotary disc valves may be seen in U.S. Pat. Nos. 4,313,015 (Broughton); 4,157,267 (Odawara et al.); 4,182,633 (Ishikawa et al.); and 4,409,033 (LeRoy).

Multiport rotary disc valves of the general arrangement shown in the above-incorporated patents have been fabricated in various sizes up to valves utilizing 4½ foot diameter rotors. These valves have seven concentric circumferential grooves, or tracks, and 24 ports spaced around the periphery of the stator. A single valve of this size weighs approximately 26,000 pounds, has an overall height of about 15 feet, and occupies a plan area of approximately 8½ by 8½ feet. These figures do not include a separate hydraulic power unit used with the hydraulically driven actuator mounted on the valve proper. It can be appreciated that it is desirable to use apparatus of less bulk and weight to accomplish the same functions; the present invention provides such a smaller rotary valve. It is capable of accomplishing the interconnection of conduits in two groups and has further utility as discussed in the paragraphs immediately following.

While the multiport rotary disc valve of Carson (U.S. Pat. No. 3,040,777) provided a satisfactory valve design for the simultaneous interconnection of two independent groups of conduits such that each conduit of the first group could be brought into individual communication with every conduit of the second group, it is not suitable when three groups of conduits must be simultaneously interconnected in the same manner. Upon reference to Broughton (U.S. Pat. No. 2,985,589), it can be seen that there are only two groups of conduits which need to be interconnected when the arrangement of the drawing of that patent is utilized. One group consists of the conduits which provide the flows entering and leaving the simulated moving bed adsorbent system, that is, the flows which are switched among the beds, such as the feed stream. A second group consists of the conduits associated with the individual beds, that is, which supply and remove fluid from the beds, one conduit being connected between each two beds. It is to be noted that each conduit of the second group serves that dual function of supply and removal, so that it is unnecessary to provide conduits for supplying fluid separate from those for removing fluid.

When it is necessary to simultaneously interconnect conduits of three different groups of conduits in accordance with a previously determined cycle, the apparatus of the present invention may be used. An example of process involving three conduit groups may be found in U.S. Pat. No. 4,402,832 (Gerhold), which is described below. As mentioned above, it is highly desirable to use a single device to do so, thereby avoiding the obvious problems associated with numerous separate valves which must be simultaneously actuated.

In the valves of Carson and Liebman, mentioned above, each of the rotor pipes contains one particular stream at all times. One end of each rotor pipe is always in communication with particular track. The present invention does not employ tracks and none of the crossover pipes are dedicated to a single stream. Further, the prior art valves do not require an particular symmetrical pattern of passageways, as noted at line 21, column 7, of U.S. Pat. No. 3,422,848. In the present invention, it is necessary that the ports and openings be arranged in a symmetrical manner in two circles, as described herein. Also, the prior art valves require the rotor to move 360° relative to the stator to accomplish a complete cycle, while the present invention moves through a complete cycle with only 180° of rotation.

DETAILED DESCRIPTION OF THE INVENTION

Following is a description of the embodiment of the invention shown in FIGS. 1 through 6. It is not intended that such description be construed as limiting the scope of the invention in any way; the description of this example is merely a convenient means to become familiar with the invention. The elements of the invention may be arranged to form other embodiments and more or fewer conduits than shown in the drawings may be accommodated.

FIG. 1 depicts an exemplary processing system which will be used in describing the invention. This processing system is described fully in the previously mentioned U.S. Pat. No. 4,402,832 (Gerhold) and it is only necessary to describe herein, in order to understand the present invention, the required fluid flow arrangement and cycle, further details being available from the patent. As depicted in FIG. 1, there are six individual separation zones, or units, denoted by reference numbers 1 through 6. There are conduits carrying four fluid streams, two streams entering the processing system and two leaving the processing system (as denoted by the arrows), labeled feed, extract, desorbent, and raffinate. These four streams may be called process flows or process streams. The manner of interconnection of the separation units by means of conduits carrying several fluid streams varies in order to simulate movement of the units in a direction cocurrent with the fluid flow.

There are six steps in a complete cycle, i.e., six different interconnection arrangements to be accomplished by the valve. Two of the steps are shown in FIG. 1 and from these two, the other four steps are easily understood. As the process, or valve, is indexed through each step of the cycle, each of the labeled streams is moved to a different separation unit. The streams may be visualized to move toward the left on FIG. 1 in order to simulate movement of the separation units to the right. During step 1, feed is provided to unit 1, impure extract is removed from unit 1 and flows to unit 2, dilute extract is recycled from the outlet to the inlet of unit 3, desorbent is provided to unit 4, dilute raffinate flows from the bottom of unit 4 to the top of unit 5, and impure raffinate is recycled at unit 6, as shown in step 1 of FIG. 1. At the end of the step 1 time period, the valve indexes, or rotates, to its step 2 position, in which feed is routed to unit 6, impure extract is removed from unit 6 and routed to unit 1, and so forth, as shown in step 2 of FIG. 1. In step 2, abbreviations are used, such as IE for impure extract; their meanings are made clear by reference to the labels of step 1 referring to the first letters of the words. It can now be understood that in step 3, feed will be routed to unit 5 and corresponding changes will be made in the origins and destinations of the other streams. During step 6, feed will be routed to unit 2 and upon the next step, return to unit 1, the cycle being repeated indefinitely. The valve shown in FIGS. 3, 4, 5, and 6 is suited to accomplish the required interconnection changes.

Figure 2:
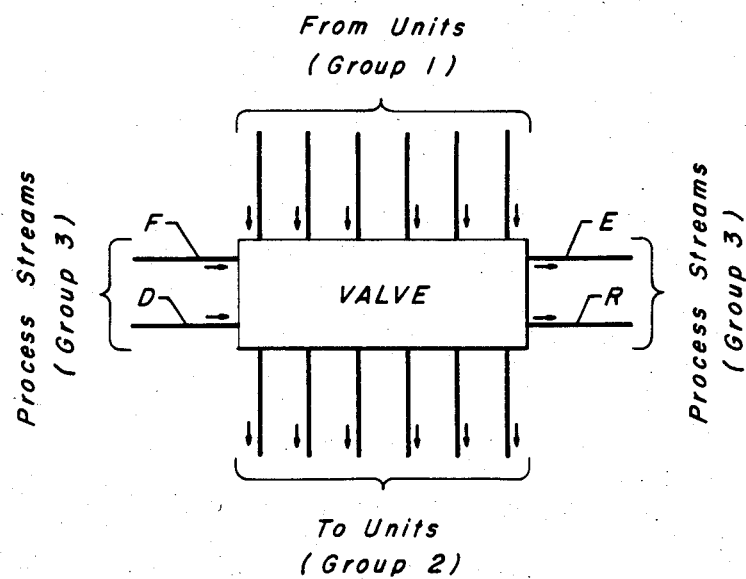
FIG. 2 is a schematic representation of a valve and conduits to be interconnected by its use as required by the process of FIG. 1.

FIG. 2 depicts the valve as a box and shows the streams of FIG. 1 as arrows entering and leaving the box. Each arrow may be viewed as a conduit, or pipeline, the direction of flow being as shown. Thus there are six conduits conveying fluid to the valve, one communicating with the outlet of each separation unit and six conduits conveying fluid away from the valve, one communicating with the inlet of each separation unit. In addition, there are four conduits to accommodate the process flows discussed above, labeled with F for feed, etc. The conduits connected to the valve may be placed in three groups: process flows, unit ins, and unit outs.

Figure 3:
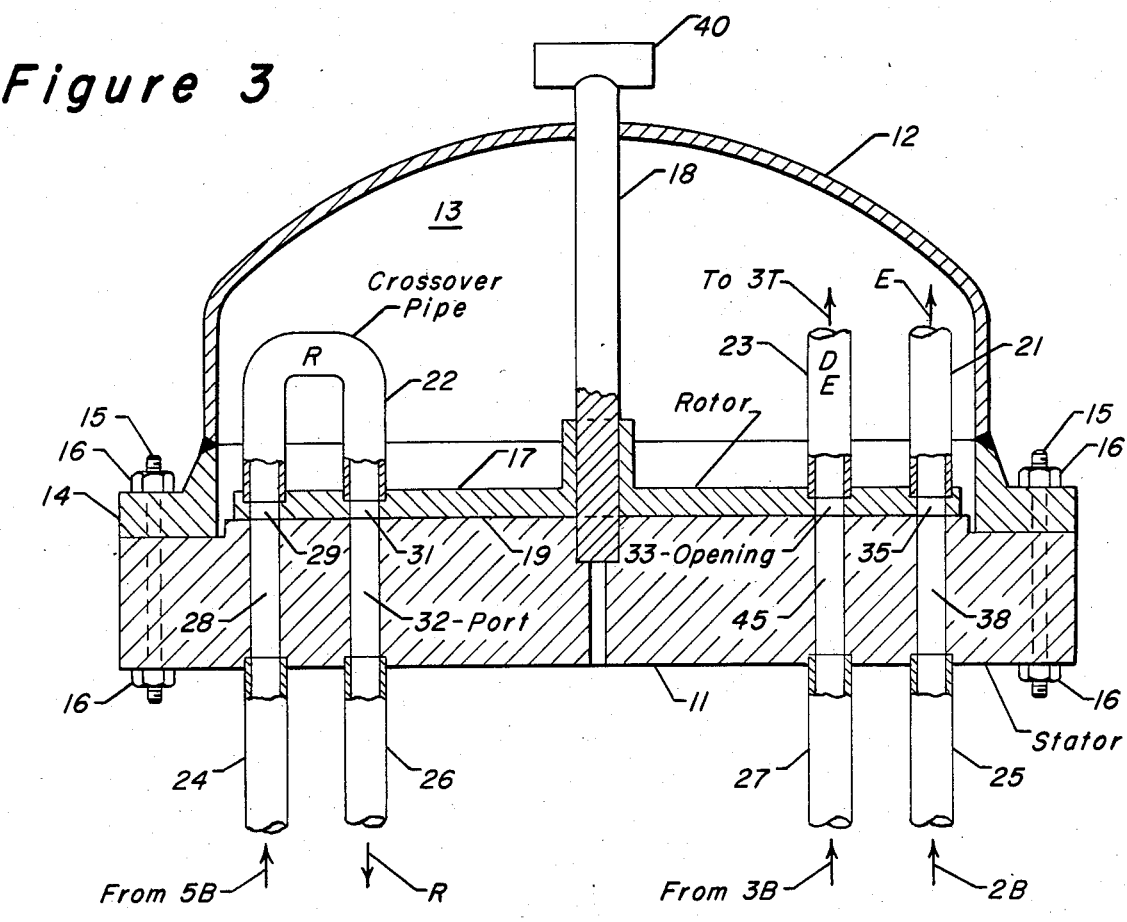
FIG. 3 is a sectional elevation view of a typical multiport rotary disc valve embodying the invention. Certain details of the valve have been omitted from the drawing as unnecessary to the complete description of the present invention. Sectional arrows showing how the elevation is taken are shown in FIG. 4. The rotor position shown in FIG. 3 corresponds to cycle step 1, described herein.

Referring to FIG. 3, stator 11, which may also be referred to as stator plate o bottom plate and which is in the form of a disc, is sealably bolted to top head 12, also called dome 12, to form the totally enclosed chamber denoted by 13, which chamber encloses the rotor. Note that as mentioned above, certain details, such as gaskets, are omitted from FIG. 3, such elements being known in the art and also shown in the patents incorporated herein by reference. A further example of such an omitted detail is a packing gland or other seal at the point where the shaft 18 passes through the dome. A fluid-tight seal is formed at the face of flange 14 of top head 12 and the flange face of stator 11 by means of a gasket or other sealing means (not show ) and studs 15 and nuts 16. Rotor 17, also referred to as rotor plate 17, has a seating surface, comprising a bottom portion of the rotor, which is in a sealing relationship to a substantially flat seating surface located on the top of stator 11. The seating surfaces are denoted by reference number 19. The nomenclature top and bottom, referring to the stator and rotor, is used as a result of the orientation of FIG. 3, and is not meant to limit the invention. Rotor 17, which is in the form of a disc, is fixed to shaft 18, located in the center of the rotor plate, and rotates with shaft 1B. Located above top head 12 are means (40) for turning shaft 18 which are capable of rotating the shaft, and thereby the rotor plate, in 30° increments. Such means for indexing a shaft, or rotating it in increments of usually less than a full rotation, are well known and may be characterized broadly as hydraulic, electrical, or electromechanical. An example of means for rotating may be found in U.S. Pat. No. 2,948,166 (Purse et al.). Instead of providing means to turn the shaft, the rotor plate may be gear-driven by a drive mechanism located at the edge of the plate.

Fluid may be added through an opening (not shown) in top head 12 so that chamber 13 is pressurized. Such pressurization aids in obtaining a seal at the seating surfaces 19 of rotor 17 and stator 11. In a similar manner, a bottom dome may be added to the valve and pressurized in order to aid in obtaining a seal. Chamber 13 also contains an leakage which may occur from the fluid-containing passages of the valve which are described below. However, use of top head 12 is not required if it is not desired or necessary to contain leakage or pressurizing fluid. There are numerous other methods of urging the seating surfaces together, or pressing the plates together, in order to form a seal, or of arranging the two plates to form a seal. An example of such a method is to use a spring or springs to urge the plates together. A collar might be added to the shaft to restrain a cylindrical spring surrounding the shaft and pressing on the top of the rotor. A plurality of springs pressing on the top of the rotor might be used, with the other ends of the springs being restrained by means affixed to the shaft or affixed to the stator.

Figure 4:
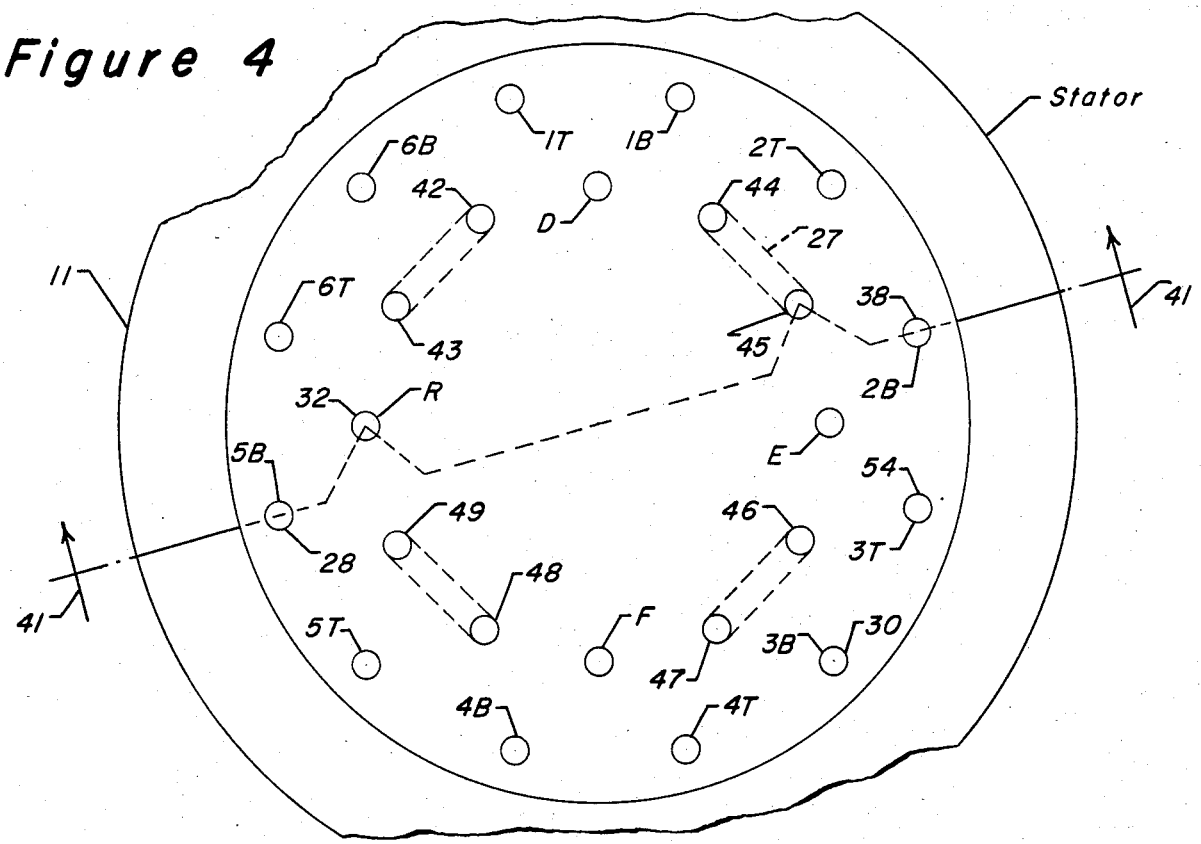
FIG. 4 is a top view, in schematic form, of the stator portion of the valve of FIG. 3, with the rotor and dome removed. The outer portion of the stator which includes the bolt circle is shown with nuts and studs omitted.

It is now helpful to view FIGS. 3 and 4 together. FIG. 3 is taken as shown by section arrows 41 on FIG. 4. The letters (those without numbers) of FIGS. 3 and 4 (and also FIG. 6) correspond with the abbreviations of FIGS. 1 and 2, e.g., F denotes the feed stream. All of the conduits discussed in connection with FIGS. 1 and 2, sixteen in number, are connected to stator 11, though only selected conduits are shown in FIG. 3 for the purpose of drawing clarity. There are twelve ports spaced around the outer periphery of the seating surface of stator 11, which constitute a first group and a second group of ports. Two of these, 28 and 38, are shown in both FIGS. 3 and 4. The other ten ports can be seen only in FIG. 4, where the six ports of the first group are labeled 1T through 6T and the six ports of the second group are labeled 1B through 6B. For present purposes, a port is defined to include both a hole, or aperture, in the seating surface and a channel running through the stator from its seating surface to its bottom. The labels 1T through 6T and 1B through 6B refer to a particular separation unit and a particula conduit attached to that unit. For example, 1T indicates that the conduit attached to that port communicates between that port and the top of separation unit 1 and 3B indicates that the conduit attached to that port communicates between that port and the bottom of separation unit 3. In FIG. 3, conduit 24 is shown attached to stator 11, communicating with port 28, and the conduit is connected at the other end (not shown) to the bottom of separation unit 5, with the direction of flow indicated by the arrow. Likewise, conduit 25 communicates, or provides a flow path, between the bottom of separation unit 2 and port 38. Conduits 24 and 25 are both in the second group of conduits and are representative of the other four conduits communicating between the separation unit outlets, or bottoms, and the second group of ports. The nomenclature "top" and "bottom" is used for convenience only because in FIG. 1, the inlets to the separation units are shown at the top of the drawing. The points on stator 11 where conduits such as 24 are attached are called conduit connection locations.

Four ports in a third group plus eight additional ports not considered to be in the third group for purposes of this example are disposed peripherally around the stator inside the first group. The eight ports not in the third group may be called tie ports; these are labeled with the reference numbers 42 through 49. Each tie port communicates with another tie port by means of a pipeline denoted a tie pipe. Since a bottom view of stator 11 is not presented herein, tie pipes are depicted by dashed lines connecting tie ports in FIG. 4. For example, fluid may flow between tie ports 44 and 45 by means of tie pipe 27 which is represented by the dashed lines. A portion of tie pipe 27 can also be seen in FIG. 3. In this example, where the fluids flowing in the process are liquids, pumps are required. For example, referring to step 1 of FIG. 1, a pump is needed to transfer dilute extract from the bottom of unit 3 to the top of unit 3. This pump may be physically located in tie pipe 27. In step 2 of the cycle, as can be seen from FIG. 1 this same pump (if needed) would be used to transfer liquid between 2B and 2T. Alternatively, a single pump could be associated with each column and used only when necessary to pump a stream associated with that column. No further mention of apparatus such as pumps and compressors used to transfer fluid need be made, as those familiar with chemical processing are able to appreciate when such apparatus is required and where in the process it needs to be located.

In FIG. 4, the four stator ports of the third group are labeled with the fluids that flow in them: F, E, D, and R. Port 32 is the only port of the third group which is shown on FIG. 3. Conduit 26, which is in the third group of conduits, communicates with port 32.

Figure 5:
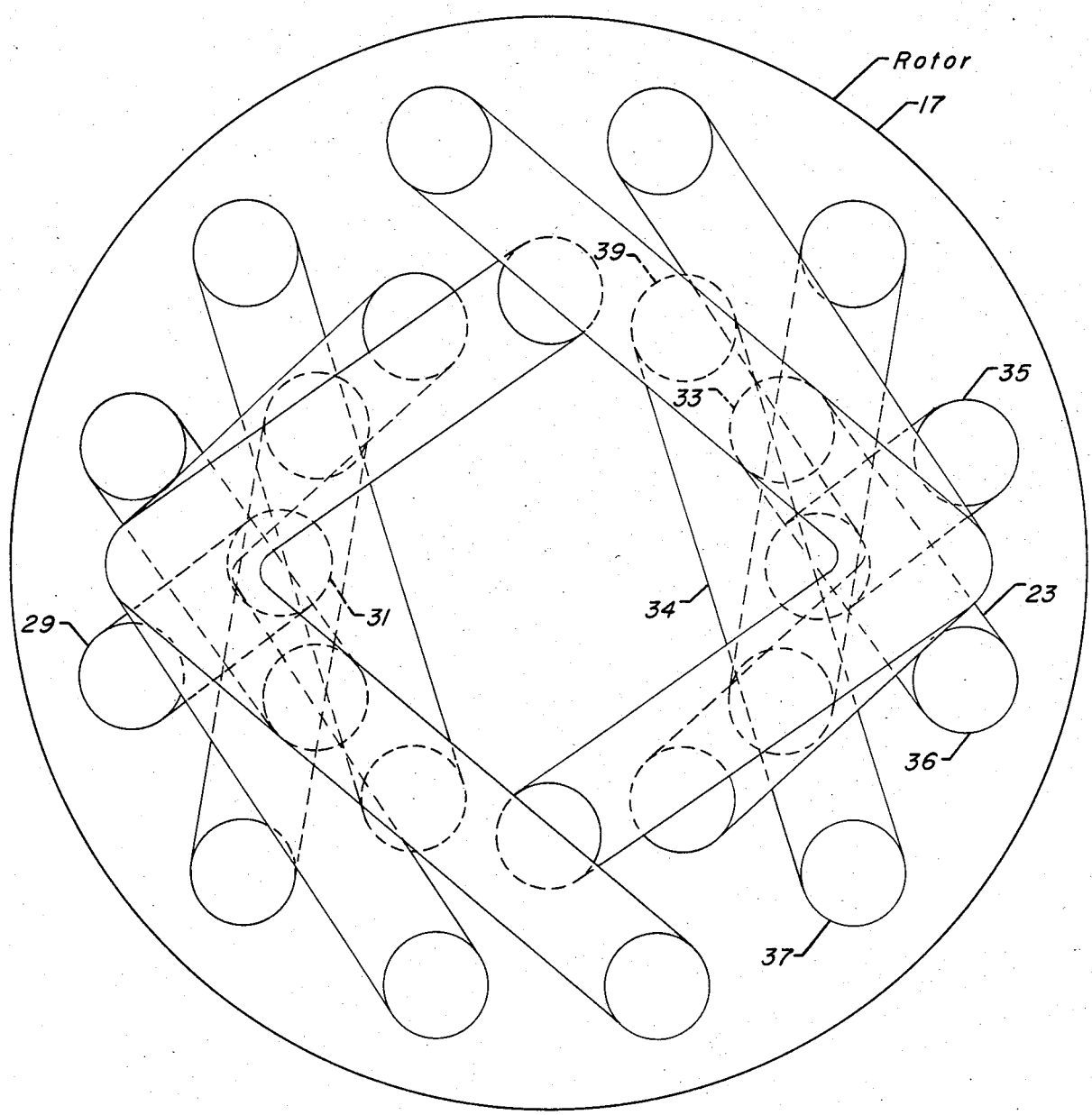
FIG. 5 is a top view of the rotor portion of the valve of FIG. 3, with certain unnecessary details omitted and normally unseen lines added to improve understanding. It is drawn with the openings and pipes in proportion to the rotor diameter and shows a possible actual arrangement of crossover pipes.
Figure 6:
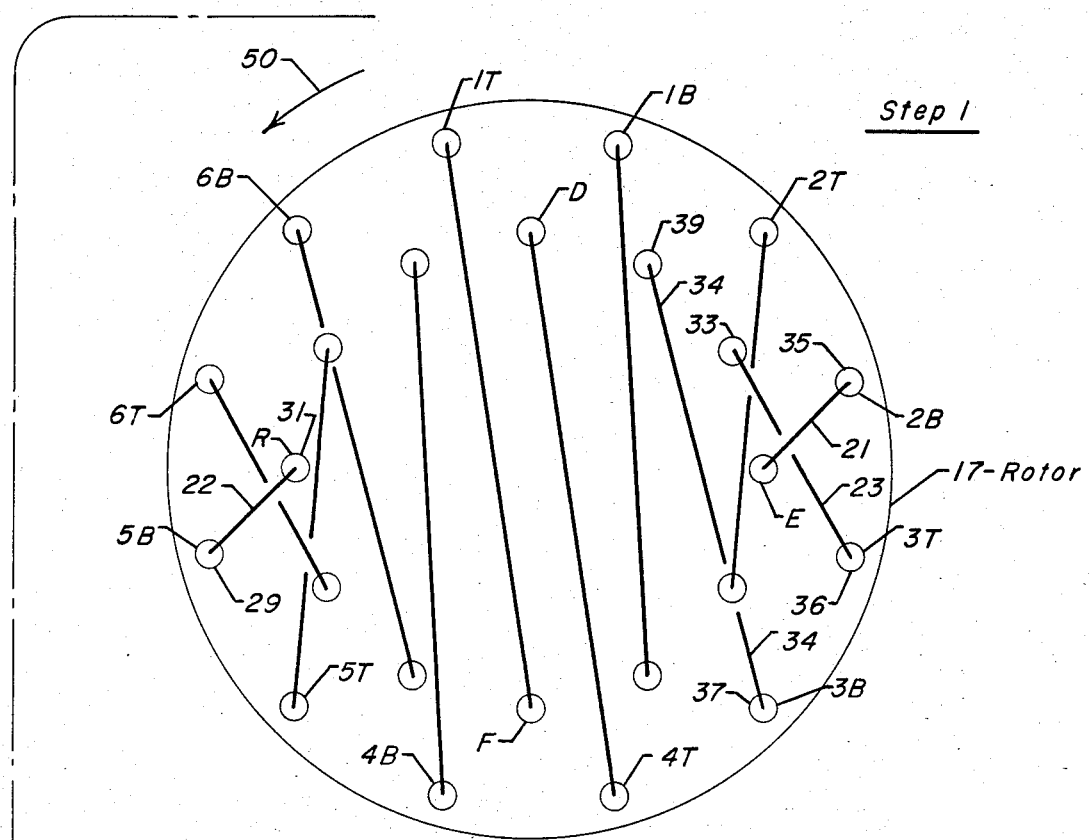
FIG. 6 is a schematic representation of the rotor of the valve of FIG. 3 as see from the top (without the top head of the valve in place). It is depicted in two different angular positions corresponding to the two steps depicted in FIG. 1.
Figure 6:
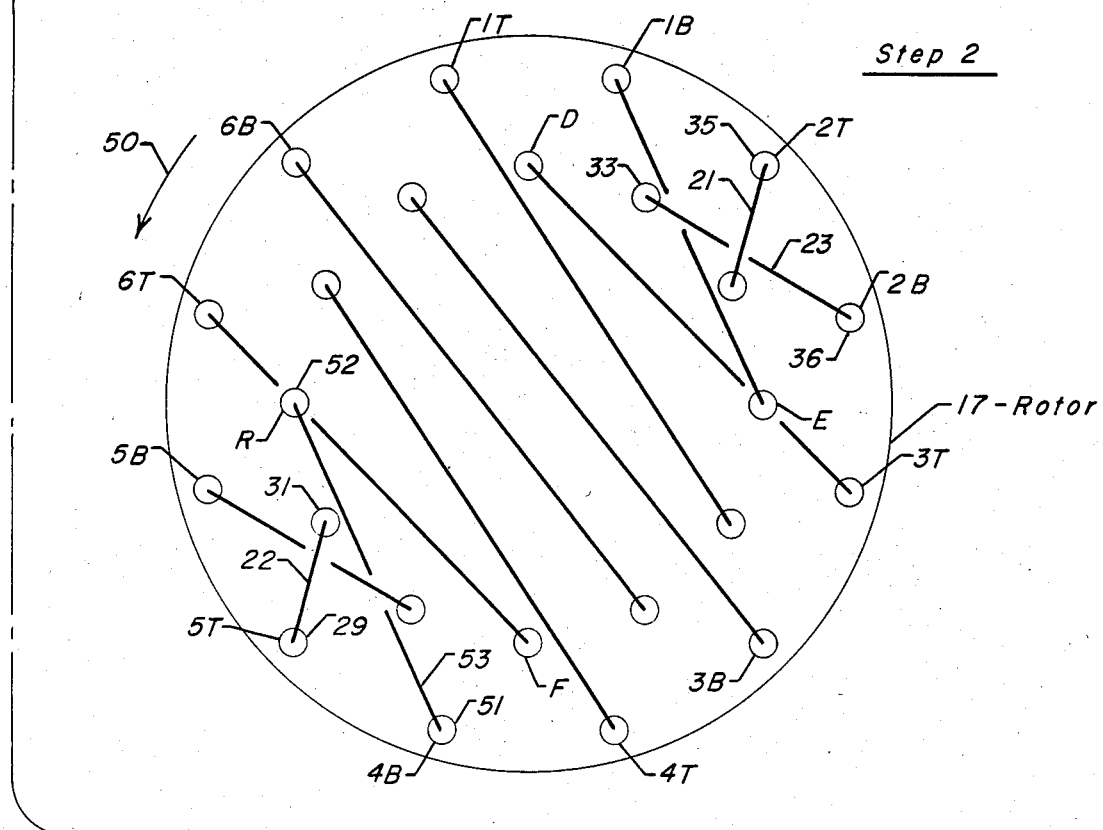

FIG. 5 and FIG. 6, step 1, may be consulted in addition to FIG. 3 for the following description of rotor plate 17. Step 1 of FIG. 6 corresponds to the index position shown in FIG. 3. There ar 24 openings in the rotor, each extending from the top to the bottom of the rotor plate. Four openings, 29, 31, 33, and 35, may be seen in FIG. 3 and all of the openings are depicted in FIG. 5 and 6. An opening is defined in the same manner as a port, above. There are twelve crossover pipes, such as 21 and 22 of FIGS. 3 and 6, connected to the 24 openings of the rotor, which communicate between the openings. These crossover pipes transfer fluid between openings of different sets. The openings may be divided into two sets corresponding with the previously discussed groups of conduits and ports. A first set of twelve openings is disposed about the periphery of the rotor, 29 and 35 being representative. A second set of twelve openings is similarly disposed inside the first group, 31 and 33 being representative. At each index position of the valve, each opening of the first set is located above a port of the first or second group, i.e., is in register with a port, and each opening of the second set is in register with either a port of the third group or a tie port.

A crossover pipe may be an type of conduit capable of containing fluid. The crossover pipes of FIG. 3 are marked with the fluids which pass through them in accordance with the usage explained above. Arrow 50 of FIG. 6 denotes the direction of rotation of the rotor. The labels generally outside the periphery of the discs of FIG. 6 are to be used in understanding the manner in which the rotor is in register with the stator. Each of these labels (1T through 6T and 1B through 6B) indicates the location of a port in the stator by means of the conduit and separation unit associated with the port.

For example, in step 1 of FIG. 6, 5B indicates that opening 29 is in register with port 28 of FIGS. 3 and 4 and 2B indicates that opening 35 is in register with port 38 of FIGS. 3 and 4.

The complete fluid transfer paths may now be understood. For example, in step 1 of the six-step cycle, raffinate (R) leaves the process system by means of conduit 26 having entered the valve by means of conduit 24, which connected to the bottom of separation unit 5, and passed through stator port 28, opening 29 of the rotor, crossover pipe 22, rotor opening 31, and stator port 32. Also in step 1, dilute extract (DE) flows from the bottom of unit 3 to port 30 (FIG. 4) by means of a conduit of the second group (conduit and port 30 not shown on FIG. 3). The DE stream flows from port 30 through, now referring to FIG. 6, opening 37, crossover pipe 34, and opening 39. Now referring to FIGS. 3 and 4, the DE stream enters tie port 44 from opening 39, flows from tie port 44 to tie port 45 by means of tie conduit 27, and enters rotor opening 33. Returning to step 1 of FIG. 6 the DE stream flows from opening 33 to opening 36 by means of crossover pipe 23. Rotor opening 36 is in register with stator port 54 (FIG. 4), which communicates with a conduit (not shown) which carries the DE to the top of separation unit 3. In a similar manner, the other streams are routed in accordance with FIG. 2, step 1. In step 2 of the cycle, the rotor is indexed, or rotated, 30° to the valve index position depicted in step 2 of FIG. 6. Arrow 50 shows the direction of rotation. Just as in step 1, raffinate passes through port 32 and conduit 26 to leave the process system. But in step 2, raffinate enters the valve through the conduit of the second group which connects the bottom of unit 4 with a stator port of the second group. The rotor openings and crossover pipe through which raffinate passes in step 2 are not the same as those handling the R stream in step 1. In step 2, it passes through rotor openings 51 and 52 and crossover pipe 53. The other flows are similarly routed in accordance with step 2 of FIG. 2.

It can be seen that there is a correspondence between the groups of conduits, groups of ports, and sets of openings. Conduits of the first group of conduits communicate directly with ports of the first group of ports, which ports communicate directly with openings of the first set of openings. The same relationship exists between items described as in a second group, that is, second group conduits to second group ports to first set openings. Conduits of the third group of conduits communicate directly with ports of the third group, which ports communicate directly with openings of the second set of openings. Crossover pipes communicate between openings of the two sets.

Figure 7:
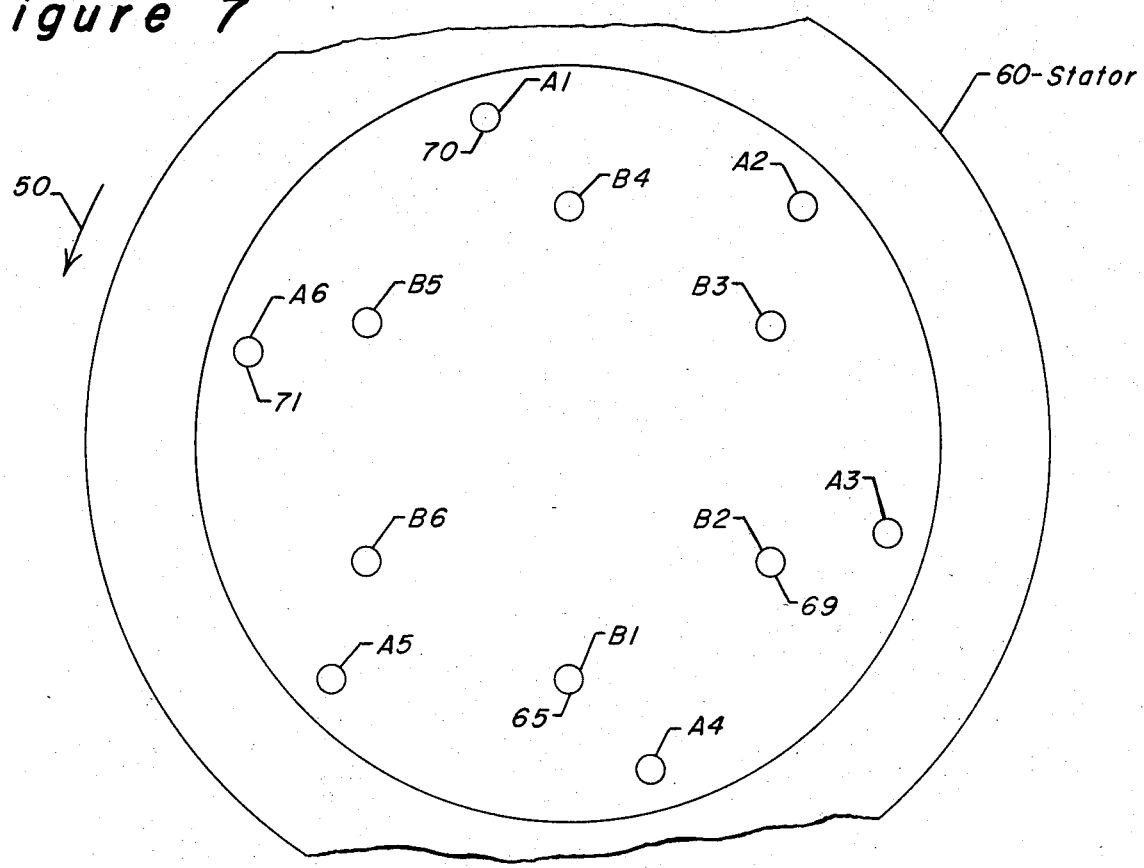
FIGS. 7 and 8 are schematic representations of a stator and rotor drawn in a manner similar to FIG. 4 and FIG. 6, step 1. A valve using these components may be used to interconnect two groups of six conduits each.
Figure 8:
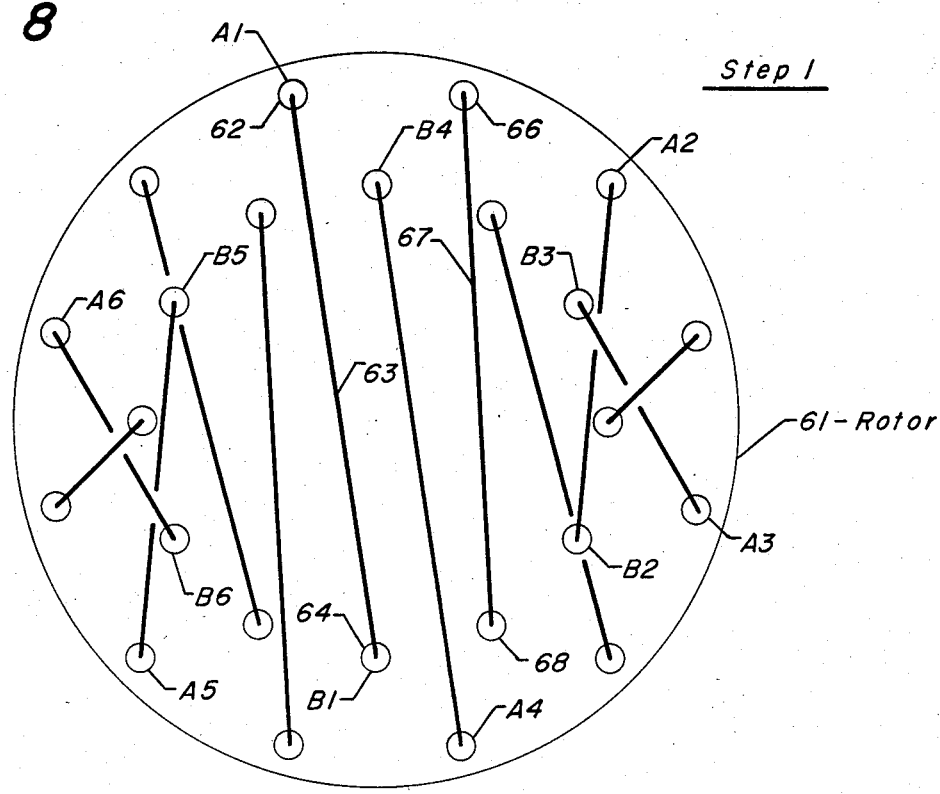

FIGS. 7 and 8 present an exemplary valve configuration which may be used to interconnect a plurality of conduits in two groups. The explanation of this example need not be as detailed as that of the previous example, since the basic principles of the invention are known from the previous example. This example is not intended to limit the scope of the invention. In this example, there are six conduits in group A and six conduits in group B, all twelve being connected to a stator in the same manner as shown in FIG. 3. Within each group, the conduits are numbered 1 through 6. It is desired to simultaneously connect, in step 1 of the cycle, A1 to B1, A2 to B2, A3 to B3, A4 to B4, A5 to B5, and A6 to B6. During step 2 of the cycle, A1 will be connected to B2, A2 to B3, A3 to B4, A4 to B5, A5 to B6, and A6 to B1. Steps 3, 4, 5, and 6 interconnections follow in a similar manner. It can be seen that each conduit of a group will communicate with every conduit of the other group during the course of a complete cycle of six steps. Referring to FIG. 7, ports in stator 60 are disposed around the axis of rotation, with the centers of that portion of each of the ports which is in the plane of the stator seating surface lying on two circles in said plane which are concentric with the axis of rotation. Alternatively, port location may be described by noting that the intersections of the ports with the stator seating surface are arranged in two circles about the axis of rotation and are equally spaced around the circumferences of the circles. Herein a circle is defined as the curve itself rather than the area bounded by the curve. The ports are equally spaced around each circle with group A ports on the outside circle and group B ports on the inside circle. In a manner similar to the previous example, the alphanumeric labels of stator 60 denote which conduit is connected to that port. For example, conduit A1 is connected to and communicates with port 70. The conduits are not shown, FIG. 7 being a top view similar to FIG. 4.

Openings in rotor 61 (FIG. 8) are disposed around the axis of rotation on concentric circles so that they will come into register with the stator ports as the valve indexes through a cycle. The openings may be divided into two groups in a manner similar to the ports and conduits, so that group A openings, in the outer ring of openings, communicate with group A ports and group B openings, in the inner ring of openings, communicate with group B ports. Rotor 61 has alphanumeric labels, as above, around its periphery to indicate which port each rotor opening is in register with in step 1 of the cycle. For example, rotor opening 62 is in register with port 70 during step 1. In step 1, fluid in conduit A1 may flow to conduit B1, passing through stator port 70, rotor opening 62, crossover pipe 63, rotor opening 64, and stator port 65. In step 2 of the cycle, which is not depicted on a drawing, fluid in conduit A1 will pass through stator port 70, rotor opening 66, crossover pipe 67, rotor opening 68, and port 69 in order to flow into conduit B2.

During step 2, openings 62 and 64 and crossover pipe 63 will not serve as a fluid transfer path, as they do during step 1. The ports are spaced 60° apart while the openings are spaced 30° apart. The rotor indexes through 30° in moving from its step 1 position to its step 2 position. Opening 62 will not be in register with any port during step 2; it will be sealed or "blanked off" by the stator seating surface at a point located midway between ports 70 and 71. Note that the rotor of step 1 of FIG. 6 has a configuration identical to the rotor of the FIG. 8 example and is depicted in the same position; thus step 2 of FIG. 6 also depicts the rotor of this example in its step 2 position. During step 3, openings 62 and 64 and crossover pipe 63 will again serve as a fluid transfer path, carrying fluid between A6 and B2. This pattern is consistent throughout the cycle and applies to all of the crossover pipes and rotor openings in this example. There are twelve crossover pipes and six cycle steps, so only six crossover pipes (and associated openings) are in use at any one time. It is important to note that the complete cycle of six steps requires only 180° of rotation of the rotor relative to the stator. This is an advantage over the prior art in that less rotation than the 360° per cycle required by prior art valves yields longer maintenance intervals for the valve of the present invention. In order to visualize the operation of the invention, FIG. 8 may be duplicated on transparent material and the transparent material placed on top of FIG. 7 or step 1 of FIG. 6 and then rotated through the six index positions.

In an embodiment of the present invention where the conduits may be characterized as being in two separate groups such as the above example, the number of stator ports required is equal to the number of conduits and the number of rotor openings is twice the number of conduits or, if there are unequal numbers of conduits in the two groups, the number of rotor openings is four times the number of conduits in the group having the most conduits. The number of crossover pipes is twice the number of conduits in the group having the most conduits. For example, where it is desired to interconnect two groups of four conduits each, the valve must have eight ports, sixteen openings, and eight crossover pipes. If one group numbers four conduits and one numbers two conduits, six ports, sixteen openings, and eight crossover pipes are required. It is interesting to note that the number of openings and crossover pipes does not change as the number of conduits in only one group is decreased. The amount of valve rotation required to accomplish one complete circle is always 180°, regardless of the number of crossover pipes. It is not possible to rearrange the elements of the valve in order to accomplish a complete cycle in 360° of rotation.

It is instructive to contrast features of the two embodiments described in the above two examples. The valve of the three-group example has more ports than the number of conduits to be interconnected by the valve in order to accommodate flows within (of course, if the flows are pumped, the pumps are not located within) the valve apparatus which are made necessary by the recirculation streams, that is, the streams flowing out of separation units and returned to a different location on the same unit; these are called tie ports in the example, and the conduits connecting the ports are called tie conduits. The number of tie ports influences usage of the crossover pipes. In the above three-group example, fluid flows in each crossover pipe during every index, or cycle, position. A complete cycle remains unchanged at 180° of valve rotation, however. The number of rotor openings is equal to the total number of ports, where the total number of ports includes tie ports. The number of crossover pipes is equal to the number of ports in the three groups (not including tie ports).

Consider a process which is the same as that of FIG. 1 except that one of the process flows leaving the system is instead routed to the separation unit next in the sequence and the flow from that unit does not recirculate. This can be seen by altering FIG. 1, step 1, so that the stream leaving unit 5 feeds unit 6 and the stream leaving unit 6 is routed out of the system. In a valve suited to this process, the number of tie ports required will be less than the FIG. 2 process but the number of rotor openings and crossover pipes will remain the same.

The process of FIGS. 1 and 2 has been characterized as requiring a valve which is capable of interconnecting three groups of conduits. This process may also be characterized as requiring a valve capable of interconnecting two groups of conduits by classifying all 16 of the streams into two groups—separation unit ins and separation unit outs. Under this characterization, the valve described in the above two-conduit group example may be used. It can be seen that the differences between the two embodiments result from the recirculation streams, shown at units 3 and 6 of step 1, FIG. 1. It may be preferable to use the "two-group valve" in a situation where, for example, it is desired to install a pump or compressor at the bottom of each separation unit. This illustrates that the design of a particular valve is dependent on a variety of criteria and the manner in which conduits are grouped influences the number of ports, openings, and crossover pipes. Of course, a valve may be designed for maximum flexibility and then used in a situation where unneeded ports are plugged. This is easily illustrated by noting that the stator of FIG. 4 can easily be substituted for that of FIG. 7; every other port in each of the two circles of ports is simply left unconnected to a conduit. If it is desired to contain process fluid left in crossover pipes after a step, the ports can be plugged. Alternatively, they could be connected to drain conduits which would route the fluid to an appropriate location. Some or all of the extra ports could be utilized for flush streams, as discussed above.

In the valves of Carson and Liebman, each of the rotor pipes contains one particular stream at all times. One end of each rotor pipe is always in communication with a particular track. The present invention does not employ tracks and none of the crossover pipes are dedicated to a single stream. Further, the prior art valves do not require any particular symmetrical pattern of passageways, as noted at line 21, column 7, of U.S. Pat. No. 3,422,848. In the present invention, it is necessary that the ports and openings be arranged in a symmetrical manner in two circles, as described above.

Figure 9:
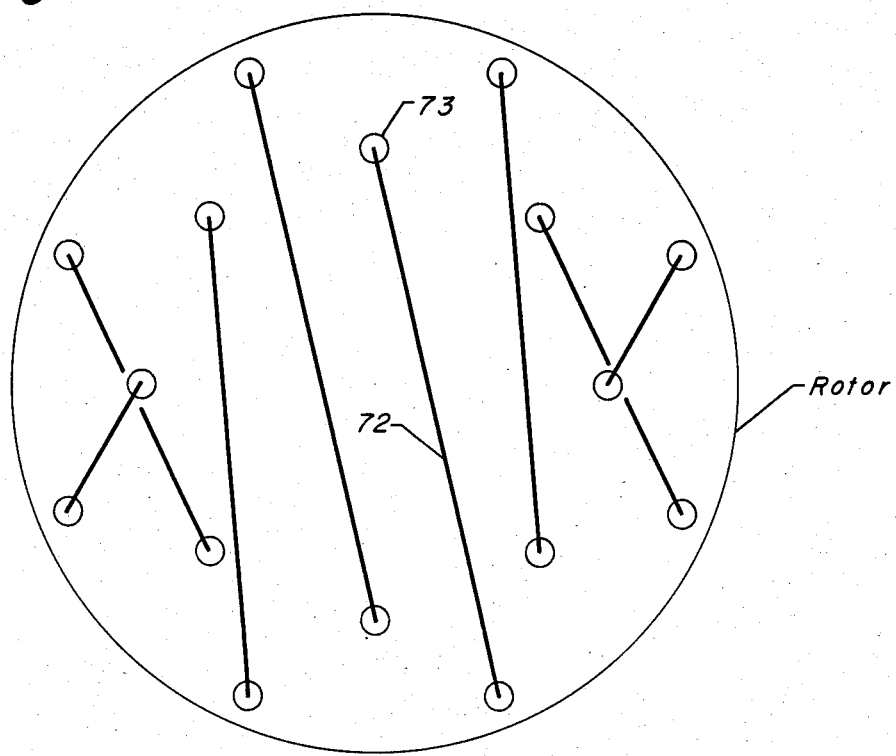
FIGS. 9, 10, 11 and 12 are schematic representations depicting the required connection pattern for rotors having crossover pipes numbering 8, 16, 20, and 24, respectively.
Figure 10:
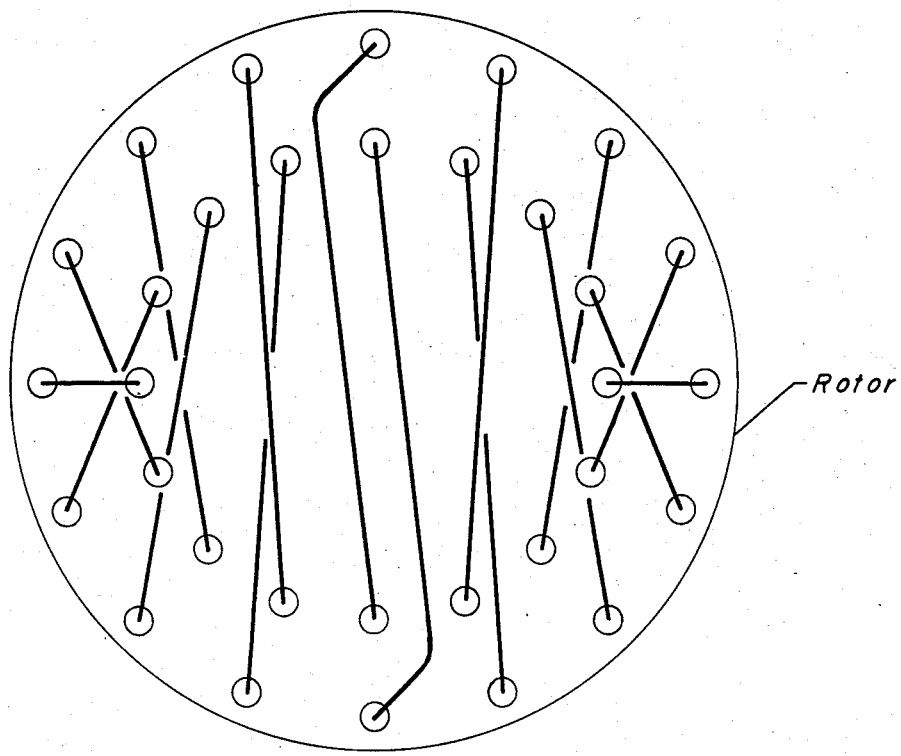
Figure 11:
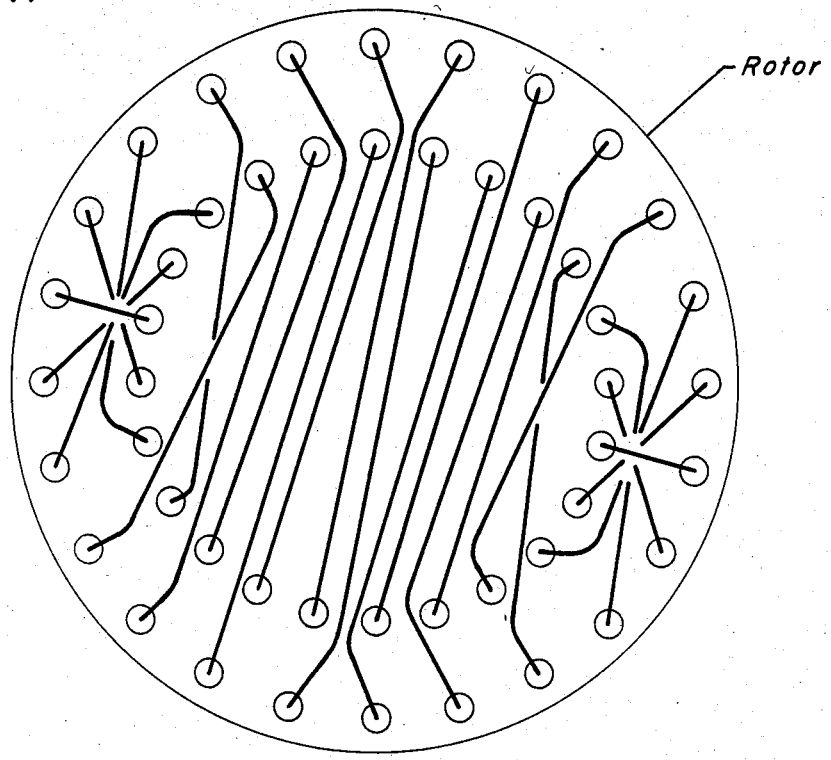
Figure 12:
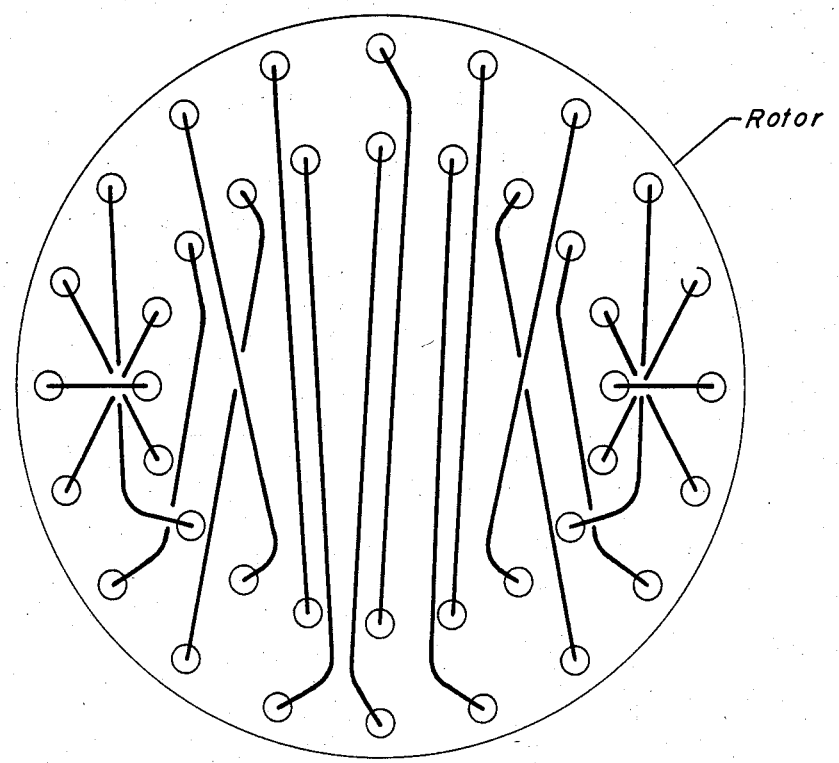

FIGS. 9, 10, 11, and 12 are provided to show the required pattern of crossover pipes for rotors utilizing a different quantity of crossover pipes (and ports and openings) than shown in the above examples. Referring now to FIG. 9, which is typical, a crossover pipe is denoted by the line 72 and an opening by the symbol at 73. While the patterns may be varied somewhat, for example, by rotating one circle of openings in relation to the other, there is only one basic pattern of crossover pipes which is suitable for practice of the invention.

It may be necessary to place pipe expansion joints in the crossover pipes to prevent damage to the valve and/or leakage due to expansion caused by high temperature fluids flowing through the valve. An elastomeric liner located between the stator seating surface and the rotor seating surface will facilitate sealing, as discussed in the patents which have been incorporated herein by reference. A liner would cover and be affixed to one of the seating surfaces and would contain apertures, or holes, for fluid to pass through so as not to block the fluid transfer paths through the valve. The apertures would correspond to the port and openings. As discussed above, it might be desirable to utilize flushing fluids; one way of doing this is to add additional conduits, ports, and openings to carry and transfer the flushing fluids.

To illustrate valve dimensions, a rotor for a valve suitable for use in the Gerhold process discussed above with six separation units can be fabricated from a 20-inch diameter forging. Two rows of 2-inch diameter openings are located on concentric circles disposed around the periphery of the forging. There are twelve openings in each row. For the same process, but with relatively high flow rates, 4-inch diameter openings arranged in the same pattern require a 38-inch diameter rotor.

When a rotary valve is referred to as indexing, it is meant that the rotor is moving. A valve index position refers to one of the positions of a rotor which is stationary and where ports and openings are in register. That the stator and rotor seating surfaces are referred to as substantially flat in certain embodiments does not preclude the surfaces of those embodiments from having ridges or other projections to aid in sealing nor is a taper to facilitate sealing precluded such as discussed in the herein incorporated references.

The components of the present invention may be fabricated from suitable materials of construction, such as metals or plastics. Sizing of the flow channels, such as the conduits, ports, and openings, is easily accomplished by reference to any of the numerous standard methods which are available.

We claim as our invention:

1. A multiport rotary valve for accomplishing the interconnection between a plurality of conduits in a first and a second group of conduits in accordance with a previously determined cycle, conduits of the first group being simultaneously connected to conduits of the second group at each step of said cycle such that in a complete cycle, each conduit of the first group come into individual communication with every conduit of the second group by means of the valve, with any conduit communicating with no more than on other conduit at any one valve index position, comprising:
   (a) a discoid stator having a substantially flat seating surface and a plurality of ports, which ports extend from the stator seating surface through the stator to communicate with said conduits, the number of ports being equal to the number of said conduits with one port communicating with each conduit to form a first group of ports and a second group of ports corresponding to said first and second groups of conduits, and the ports being disposed around an axis of rotation;
   (b) a discoid rotor having a seating surface which is in fluid-tight contact with said stator seating surface which rotor rotates about said axis of rotation to various valve index positions in accordance with said previously determined cycle, where said axis passes through the center of both the rotor and stator and is normal to said seating surfaces, and which rotor has a plurality of openings, each opening extending from said rotor seating surface through the rotor to another surface of the rotor, the number of openings being equal to four times the number of conduits in the group having the most conduits, the openings being divided into a first and a second group with an equal number in each group where the first group of openings is associated with said first group of ports and the second group of openings is associated with said second group of ports and the openings are disposed about the axis of rotation such that in each index position, each port of said first group in the stator is in register with a different one of the openings of said first group of rotor openings, each port of said second group in the stator is in register with a different one of the openings of said second group of rotor openings and any openings in excess of the number of ports are sealed off at said seating surfaces; and
   (c) a plurality of crossover pipes connected to the rotor, each crossover pipe communicating between two openings and completing a fluid transfer path between conduits of said first and second groups in accordance with said previously determined cycle, where that part of a fluid transfer path between a conduit and a crossover pipe comprises a port and an opening, with the number of crossover pipes being equal to twice the number of conduits in the group having the most conduits, and one half or fewer of the crossover pipes not serving as fluid transfer paths at any one time, and the crossover pipes arranged in a pattern such that in indexing through a whole of one of said previously determined cycles, the rotor rotates through 180 degrees.

2. The rotary valve of claim 1 further characterized in that the intersections of the ports with the stator seating surface are arranged in two circles about said axis of rotation and are equally spaced around the circumferences of the circles.

3. The rotary valve of claim 1 further comprising a casing in fluid-tight contact with the stator to form a chamber which encloses the rotor.

4. The rotary valve of claim 1 further comprising means for applying seating force to press the rotor and stator together.

5. The rotary valve of claim 4 further characterized in that said means for applying seating force comprises a casing in fluid-tight contact with the stator to form a chamber which encloses the rotor and means for pressurizing the chamber.

6. A multiport rotary valve for accomplishing the simultaneous interconnection of a plurality of conduits which are divided into a first, a second, and a third group of conduits in accordance with a previously determined cycle, where any conduit communicates with no more than one other conduit at any one valve index position, comprising:

(a) a discoid stator having a substantially flat seating surface and a plurality of ports, which ports are disposed around an axis of rotation, each port extending through the stator from the seating surface to another surface of the stator, the number of ports being at least equal to the number of said conduits, where each of said conduits communicates with a port, and at least a quantity of the ports which is equal to the number of said conduits is divided into a first, a second, and a third group of ports;

(b) a discoid rotor having a seating surface which is in fluid-tight contact with said stator seating surface, which rotor rotates about said axis of rotation to various valve index positions in accordance with said previously determined cycle, where said axis passes through the center of both the rotor and stator and is normal to said seating surfaces, and which rotor has a plurality of openings, each opening extending from said rotor seating surface through the rotor to another surface of the rotor, the number of openings being at least equal to the total number of ports, the openings being divided into a first and a second set of openings and disposed about the axis of rotation such that in each index position, each port of said first and second group in the stator is in register with a different one of the openings of the first set of rotor openings, each port of said third group in the stator is in register with a different one of openings of the second set of rotor openings and any openings in excess of the number of ports are sealed off at said seating surfaces; and (c) a plurality of crossover pipes connected to the rotor, each crossover pipe communicating between two openings in order to complete fluid transfer paths between conduits of said first and second groups, conduits of said first and third groups, and conduits of said second and third groups in accordance with said previously determined cycle, where that part of a fluid transfer path between a conduit and a crossover pipe comprises a port and an opening, with the number of crossover pipes being at least equal to the number of said openings divided by two and the crossover pipes arranged in a pattern such that in indexing through a whole of one of said previously determined cycles, the rotor rotates through 180 degrees.

7. The rotary valve of claim 16 further comprising tie pipes, which are each connected to the stator at two locations other than at said stator seating surface and which each provide a fluid transfer path between two ports which do not communicate with said conduits.

8. The rotary valve of claim 6 further characterized in that the intersections of the ports with the stator seating surface are arranged in two circles about said axis of rotation and are equally spaced around the circumferences of the circles.

9. The rotary valve of claim 6 further comprising a casing in fluid-tight contact with the stator to form a chamber which encloses the rotor.

10. The rotary valve of claim 6 further comprising means for applying seating force to press the rotor and stator together.

* * * * *

UNITED STATES PATENT AND TRADEMARK OFFICE
CERTIFICATE OF CORRECTION

PATENT NO. : 4,632,149
DATED : December 30, 1986
INVENTOR(S) : Oroskar et al.

It is certified that error appears in the above-identified patent and that said Letters Patent is hereby corrected as shown below:

In Column 14, line 24: Change "come" to -- comes --;

line 27: Change "on" to -- one --;

In Column 16, line 34: Change "16" to -- 6 --.

Signed and Sealed this

Thirty-first Day of March, 1987

Attest:

DONALD J. QUIGG

*Attesting Officer*  *Commissioner of Patents and Trademarks*